United States Patent [19]

Maisonneuve

[11] 4,178,836
[45] Dec. 18, 1979

[54] MECHANICAL HYDRO SERVO VALVE

[75] Inventor: Hubert Maisonneuve, West Columbia, S.C.

[73] Assignee: Canron Inc., New York, N.Y.

[21] Appl. No.: 766,672

[22] Filed: Feb. 8, 1977

[51] Int. Cl.² .............................................. F15B 9/12
[52] U.S. Cl. ......................................... 91/381; 91/470
[58] Field of Search ............................. 91/381, 375 R

[56] References Cited

U.S. PATENT DOCUMENTS

| 1,729,173 | 9/1929 | Morfaing ........................ 91/381 |
| 2,952,245 | 9/1960 | Curlett et al. .................. 91/381 |

FOREIGN PATENT DOCUMENTS 2312817  12/1976  France ........................ 91/381

Primary Examiner—Paul E. Maslousky

Attorney, Agent, or Firm—Wenderoth, Lind & Ponack

[57] ABSTRACT

A hydro mechanical condition-responsive servo control valve for controlling a variable condition, such as position or rate of change of position, of a remote element, comprises a rotary fluid valve controlled by a differential gear train arranged to register differential movement between two input shafts, one of which is connected for movement according to a desired input condition and the other of which is alternatively connected either to register the actual element condition or a reference [datum] condition; the rotary valve including mating stationary and rotary valve plates each incorporating fluid flow ports cooperatively arranged on the mating plate surfaces thereby to control fluid flow from a fluid inlet to a fluid outlet in accordance with the relative position or movement of said two input shafts.

8 Claims, 20 Drawing Figures

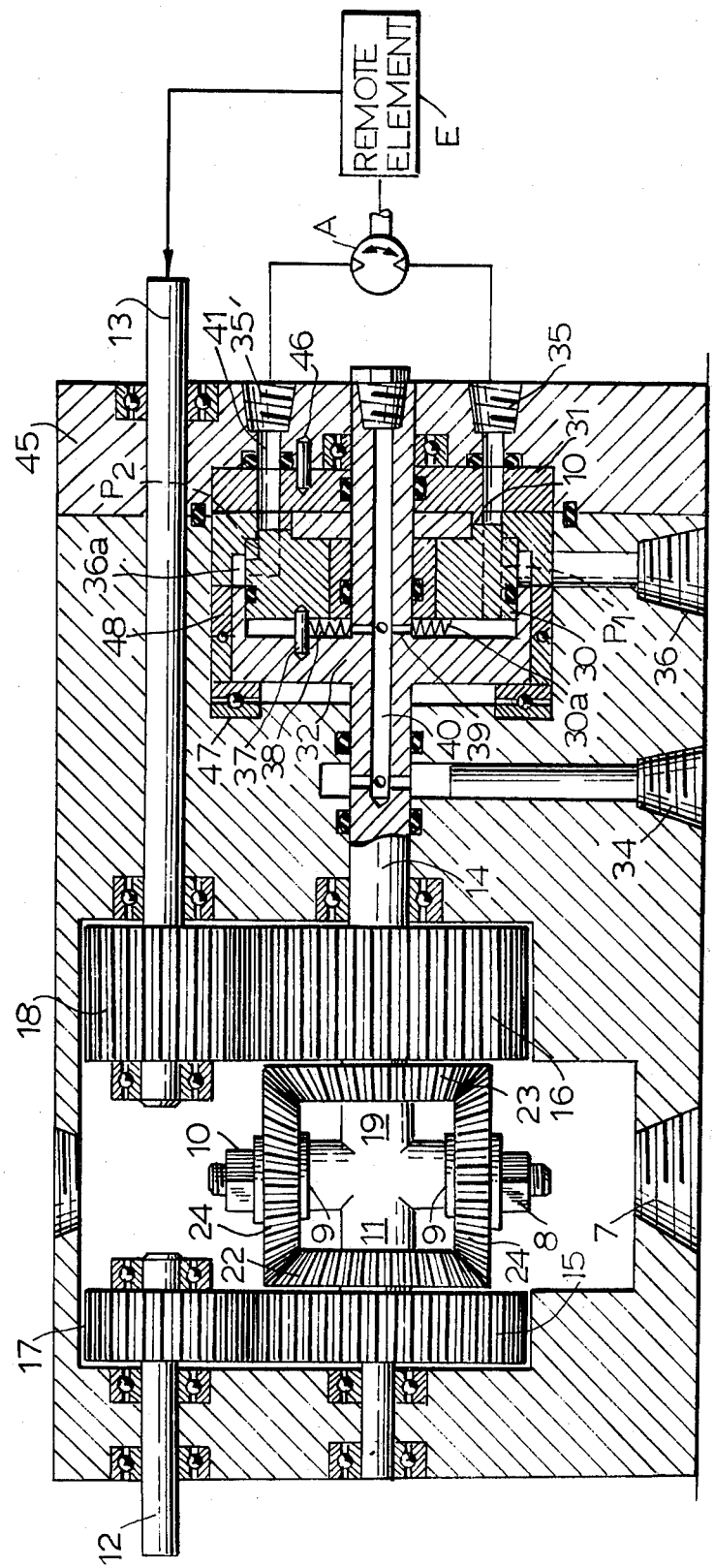

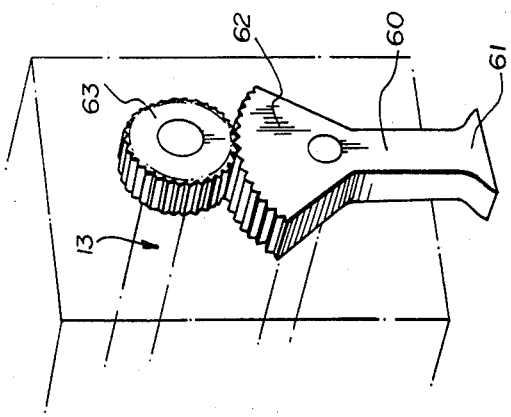
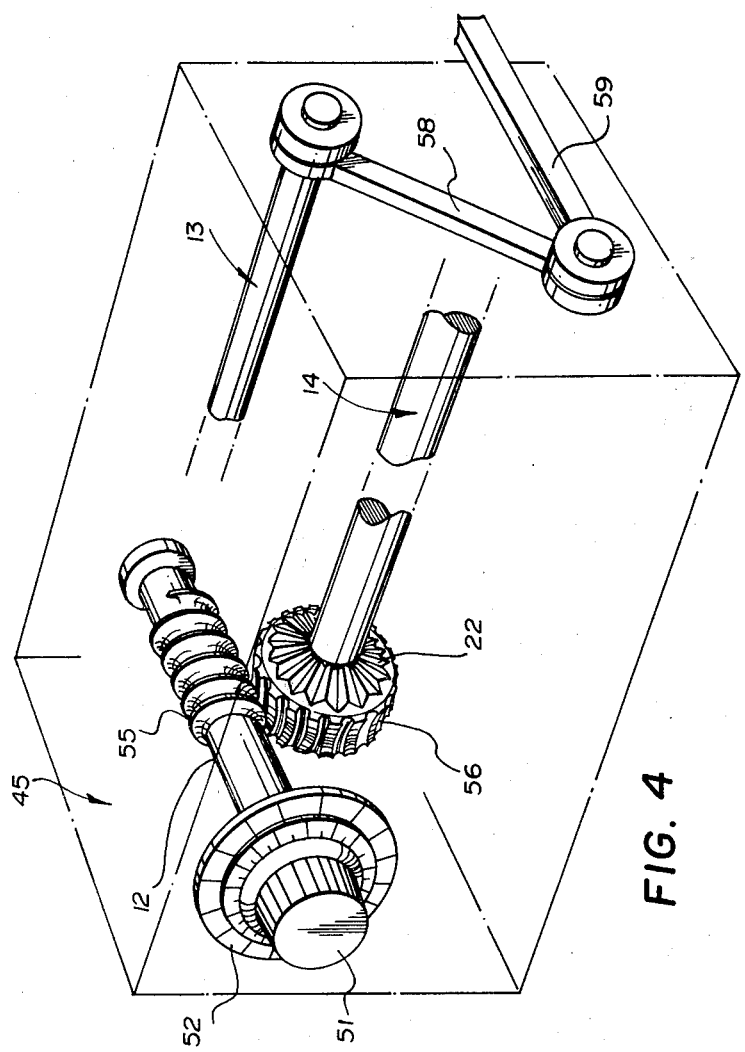
FIG. 5
FIG. 4

MECHANICAL HYDRO SERVO VALVE

This invention relates to a condition-responsive servo control valve for controlling a variable condition of a remote element. Servo control valves in general are well known but have hitherto been of complex and sometimes frail design in order to achieve the necessary accuracy and sensitivity of operation.

An object of the present invention is to achieve a servo control valve of rugged and simple mechanical construction. This is in contrast with, say, known servo control valves, for example, of the electro-hydraulic, analog or digital type, which are normally controlled through a complex electronic network of high gain amplifiers and feedback loops, which are by nature fragile, voltage and temperature sensitive and susceptible to breakdown. Moreover, in the hydraulic circuitry a high degree of fluid filtration is necessary to maintain correct functioning, due to the tiny orifices employed, for example in the flapper type valve or the primary pilot control section and the square shoulder abutment of the round valve spool in the main directional section of the valve.

It is a further object of the invention to eliminate the disadvantages of such conventional electro-hydraulic servo control valve by using a solid and rigid mechanical construction, in which the hydraulic control valve section is resistant to normal fluid contamination, and the effects of vibration, impact and temperature changes.

According to the invention there is provided a condition-responsive servo control valve for controlling a variable condition of a remote element, the valve comprising a first input shaft rotatable according to a desired input condition and a second input shaft alternatively rotatable according to either the actual condition of said element or a datum condition, a differential gear train interconnecting said first and second input shafts to an output shaft, and a rotary fluid valve operably connected to said output shaft to provide a fluid output representing the difference between the conditions determining the first and second input shaft positions, which output may be applied to actuator means operable to bring the actual or reference and desired input conditions into conformity.

In practice, in order to increase the sensitivity of response of the rotary fluid valve to movement of the first input shaft, reduction gearing may be employed between the first input shaft and the differential gear train. Similarly, in order to increase the sensitivity of response of the rotary fluid valve to movement of the second input shaft, reduction gearing may be employed between the second input shaft and the differential gear train.

The second input shaft is operatively connected to the element under control for closed loop control, but is isolated from the element for open loop control and in this case may be set to a reference position for such control.

In a practical mechanical construction, the rotary fluid valve comprises a rotary valve plate drivably connected to the output shaft and mating with a stationary valve plate cooperatively arranged therewith, the rotary and stationary valve plates each incorporating fluid flow ports arranged in cooperative relationship to control fluid flow from a valve inlet, connected to a fluid reservoir, to a valve outlet, connected to a fluid actuator operable to control the element condition, according to the relative angular positions of the rotary and stationary valve plates.

For example, in a suitable port configuration, the rotary and stationary valve plates each incorporate in their mating surfaces generally annular ports, of configuration, in particular width, varying with angular position, according to the desired output flow-rate per change in the relative angular position of the valve plates.

These valve ports may be arranged to achieve a null reference position, corresponding to no relative angular displacement between the first and second input shafts, or identity between the desired and either the actual or reference conditions at which there is no fluid connection between the fluid inlet and outlet and thus no fluid output to the fluid actuator.

For improved sealing, the stationary and rotary valve plates are desirably biassed together under fluid pressure from the fluid inlet to achieve a sealing action therebetween, and fluid is also fed between the mating surfaces thereof to reduce rotational friction therebetween.

A mechanical spring biassing means could be used to urge the stationary and rotary valve plates into rotational sealing engagement.

The valve may be adapted to respond to either the absolute angular position of the first input shaft or the rate of change of the angular position of the first input shaft, relative to the second input shaft.

In a suitable mechanical construction for the differential gear train there are employed two intermeshing gears, each of mutually-opposed, coaxial, independently-rotatable level gears; one of the gears of one pair being drivably connected to the first input shaft and the other gear can be drivably connected to the second input shaft; the other pair of level gears being freely and independently rotatable about a common axis at right angles to the common rotational axis of the one pair and being supported in a spider so the gears of the other pair intermesh with both gears of the one pair on opposite sides of the rotational axis of the one pair; the spider being drivably connected to the output shaft thereby to rotate according to differential movement between the first and second input shafts.

Desirably, mechanical biassing means is arranged to urge the pairs of gears into mutal interengagement to minimize backlash therebetween and thus hysteresis in the response characteristic of the valve.

Important applications of the servo control valve according to the invention include an alignment device incorporating the valve and in which the first input shaft is connected to a pendulum through a step-up gear means and the second input shaft is isolated from the element level and is movable according to a desired reference level; the output shaft being connected to actuator means operable to effect a level change of said element, whereby the element may be set level or at a desired inclination.

In a further application of such alignment device an optical sight is operatively connected by adjustment means to the first input shaft for sighting a reference mark on the element to be controlled, the second input shaft being connected to register the element position.

Such alignment devices may be used in the levelling and alignment of railway track and several of such devices may be used cooperatively to align the track with respect to a variety of different axes. For example, three units may be combined and may indeed be operatively interconnected to align a track in three dimensions.

DESCRIPTION OF PREFERRED EMBODIMENTS

The following is a description of some preferred particular embodiments of the invention, by way of example only, with reference to the accompanying diagrammatic drawings, in which:

DESCRIPTION OF DRAWINGS

FIG. 1 shows a sectional view of a condition-responsive, servo control valve according to the invention, depicting the layout of the principal elements;

FIG. 4 shows a general perspective view of an operational servo control valve unit with an input control dial and feedback connecting link;

FIG. 5 shows a general perspective view of a servo control valve adapted for use as a level alignment device with an input control dial and a reference pendulum feedback linkage;

Figure 2D:
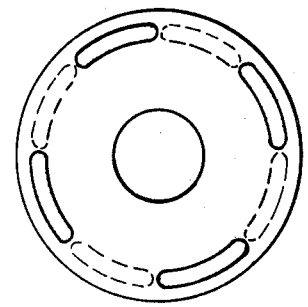
FIGS. 2a, 2b, 2c and 2d show different configurations of valve plates for the rotary valve shown in FIG. 1.

Referring to the drawings, in particular FIG. 1, a condition-responsive servo control valve essentially comprises a hydromechanical valve incorporating a rotary fluid valve 10 operatively connected to a mechanical drive assembly 11. The drive assembly 11 essentially comprises differential gearing interconnecting a first input shaft 12, a second input shaft 13 and an output shaft 14, drivably connected to operate the rotary valve 10. Movement of the output shaft 14 and thus operation of the rotary valve 10 is in accordance with differential movement between the first input shaft 12 and the second input shaft 13. In order to provide a suitably scaled response characteristic for movement of the output shaft 14 with respect to differential movement between the input shafts 12 and 13, step-up gearing is employed between the first and second input shafts 12 and 13 and the differential gear assembly. The latter comprises two gear pairs, each of opposed bevel gears, the opposed gears of one pair being rotatable about an axis at right angles to the common rotational axis of the opposed gears of the other pair. Specifically, opposed bevel gears 22 and 23 of one pair are drivably connected to pinion gears 15 and 16 respectively, which in turn mesh with pinion gears 17 and 18 mounted on the first and second input shafts 12 and 13 respectively. The pinion gears 15 and 16 are coaxial with the output shaft 14, but are freely rotatable independently thereof.

In the differential gear unit the other pair of gears comprises two opposed freely and independently rotatable coaxial bevel gears 24 which mesh with the bevel gears 22 and 23 of the other pair, but which are supported in a spider 19, which maintains their common rotational axis at right angles to the common axis of rotation of the bevel gears 22 and 23 and which is itself rotatable about the latter axis and is drivably connected to the output shaft 14. In this way differential movement between the bevel gears 22 and 23 is accommodated by differential rotation of the opposed bevel gears 24 and consequent rotation of the spider 19 about the axis of pinion gears 15 and 16 and bevel gears 22 and 23. This rotary movement of the spider 19 is transmitted to the output shaft 14 and thence to the rotary fluid valve 10.

The rotary valve 10 comprises a rotary valve plate 30 mating with a stationary valve plate 31. Both plates 30 and 31 incorporate fluid flow ports connected, in the case of the rotary valve plate, to a source of fluid through a inlet port 34, and in the case of the stationary valve plate 31 to outlet ports 35, which in turn are connected to a schematically shown fluid actuator A arranged to control the condition of the remote element E to be controlled. The configuration of fluid flow ports in the rotary and stationary valve plates 30 and 31 is arranged so that, upon relative rotation between the valve plates, a fluid path is opened up between the valve inlet means in the form of the inlet port 34 and the valve outlet means in the form of outlet port 35 to allow fluid flow from a source of fluid under pressure to the fluid actuator and return to fluid reservoir.

Considering the rotary fluid valve in more detail, the rotary valve plate 30 is drivably connected through sliding pins 37 to a driving plate 32 rotatable fast with the output shaft 14 of the differential gear assembly. The shaft 14 has an internal bore 40 for the passage of fluid from the inlet port 34, and communicates with a narrow chamber 38 between the driving plate 32 and the rotary valve plate 30 through fluid passages 39 in the shaft 14. In this way fluid under pressure is admitted to the chamber 38 and the rotary valve plate is urged towards the stationary valve plate 31. Additional mechanical spring biasing of the rotary valve plate 30 towards the stationary valve plate 31 is achieved by means of a corrugated spring 30a (not shown).

The rotary valve plate 30 incorporates a series of ports p in an annular configuration and various alternative port configurations are shown in FIGS. 2a, 2b, 2c and 2d with attendant operating characteristics shown in FIGS. 3a, 3b, 3c and 3d respectively, as described later. These ports in the rotary valve plate 30 are shown in dotted lines in FIG. 1, and cooperate with the ports 41 in the stationary valve plate 31.

The stationary valve plate 31 is held in position in the valve casing 45 by means of locating pins 46. An axial thrust bearing 47 is provided in the valve casing 45 to support the axial thrust of the driving plate 32 on the rotary valve plate 30 and a radial bearing 48 is also provided for the driving plate 32.

It will be appreciated from FIG. 1 that relative rotation between the rotary valve plate 30 and the stationary valve plate 31 varies the interconnection of the ports in the rotary valve plate 30 with the ports 41 in the stationary valve plate 31. The relationship between the ports is more readily apparent from FIGS. 3a to 3d. The affect of rotation of the rotary valve plate 30 is to vary the fluid interconnection between the inlet port 34 and the outlet port 35. An annular groove 36a is provided around rotary valve plate 30 and a port 36 is also provided for opening out of groove 36a connection to a return path to a fluid reservoir.

Figure 2C:
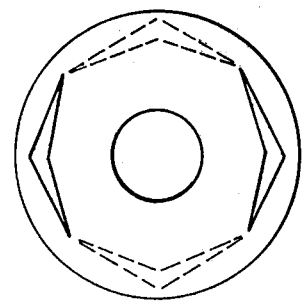
Figure 2B:
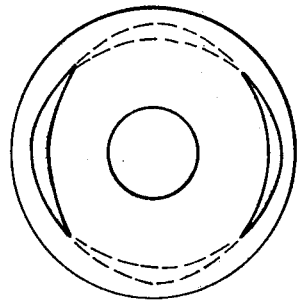
Figure 2A:
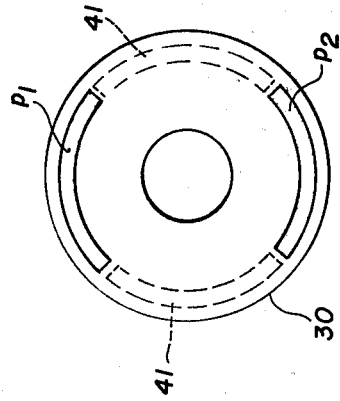
Figure 3D:
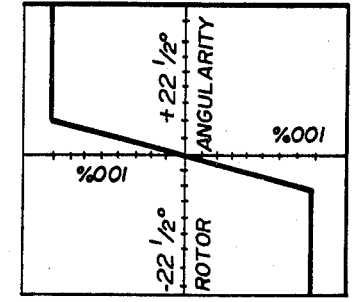
FIGS. 3a, 3b, 3c and 3d show the operational characteristics of the various valve plates shown in FIGS. 2a, 2b, 2c and 2d respectively.
Figure 3C:
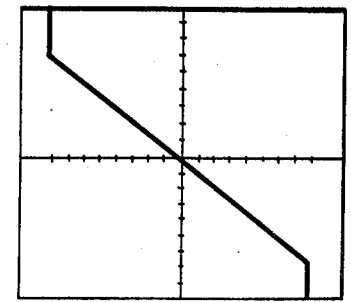
Figure 3B:
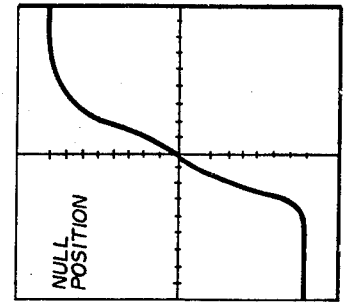
Figure 3A:
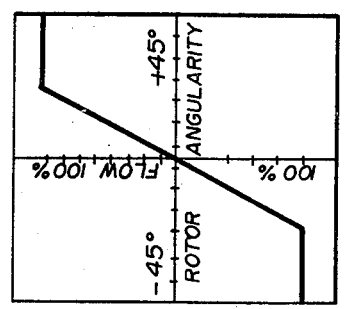

Referring to FIGS. 2a to 2d, there are shown various generally annular port configurations for the rotary valve plate 30. Thus, in FIG. 2a, two segmental annular ports $p_1$ and $p_2$ are employed as fluid ports and these result in a sharp cutoff for movement of the rotary valve plate 30 bringing the part annular port regions away from the ports 41 (shown schematically in dotted lines) in the stationary valve plate 31. A more gradual transition between a full flow and no flow condition is achieved by the teardrop shape port configuration shown in FIG. 2b—in this case there is no sharp cutoff but a gradual reduction and increase in fluid flow with rotation of the rotary valve plate 30. These operational characteristics are shown in FIGS. 3a and 3b. A modification of the teardrop shape port configuration of FIG. 2b is shown in FIG. 2c, providing a sharper transition between the changing flow rates resulting from rotation between the stationary and rotary valve plates 30 and 31. Yet another variation is shown in FIG. 2d using an increase in the number of ports, in this case four ports at 45° angular intervals producing a response characteristic shown in FIG. 3d. It will be appreciated that the port configuration can be varied according to the particular operating requirements.

Returning again to FIG. 1, the overall operation of the condition responsive servo control valve is as follows:

Relative movement between the first input shaft 12 and the second input shaft 13 produces differential movement between the bevel gears 22 and 23 and thus rotation of the spider 19 carrying the bevel gears 24. This in turn produces rotation of the output shaft 14 and rotation of the rotary valve plate 30 relative to the stationary valve plate 31. This produces a fluid flow from the inlet 34 to the outlets 35.

For closed loop control of an element, the first input shaft 12 is moved according to the desired condition of element E and the second input shaft 13 is connected to the element E to register the actual element condition. In this way differential movement between the first and second input shafts 12 and 13, representing a difference between the desired and actual conditions of the element, produces an output from the fluid port 35 which is fed to a fluid actuator A arranged to move or adjust the condition element E until the actual element condition reaches the desired element condition. In this case the second input shaft 13 will register the new element condition and will result in equality between the conditions registered by the first and second input shafts 12 and 13 and thus no differential movement in the differential gear assembly and no movement of the output shaft 14 from a null reference position in which the rotary fluid valve 10 is arranged to produce no output, that is there is no connection between the fluid inlet port 34 and the fluid outlet port 35.

For open loop control of an element condition, the second input shaft 13 is set to a reference position and control action will be initiated when the position of the first input shaft 12 differs from that of the second input shaft 13, i.e. whenever the desired input condition differs from the reference condition. In this case the null position of the rotary valve 10, that is when there is no fluid output from the ports 35, will correspond to equality between the desired and reference conditions, i.e. when the element is in the reference condition.

It should be appreciated that the valve can respond to either absolute angular position of the first and second input shafts 12 and 13 or to the change in position or speed of those elements. The shafts 12 and 13 may be connected to register linear movement by a simple rack and pinion gear arrangement.

An example of a practical application of the valve according to the invention is shown in FIGS. 4 and 5. In the servo control valve shown in FIG. 4, the input shaft 12 is rotated by means of a control knob 51 with reference to a dial 52. The input shaft 12 carries a worm gear 55 which meshes with a worm gear 56 rotatably fast with the bevel gear 22 of the differential gear assembly described with reference to FIG. 1. In a practical example, the drive ratio between the meshing gears 55 and 56 is 60 to 1 so that one full turn of the knob 51 through 360° will rotate the bevel gear 22 through 6° and thus the spider 19 of the differential gear assembly will also rotate through 6°, given that the second input shaft 13 remains stationary. The latter is connected to a lever 58 and linkage 59 to register the actual position of the element under control. As before, movement of the spider 19 connected to the output shaft 14 will rotate the rotary fluid valve and apply fluid to a fluid actuator arranged to move the element under control. This movement will be registered by the feedback lever 58 through linkage 59 and will feed back to the differential gear through the second input shaft 13.

The first input shaft 12 need not be moved manually, instead a motor, for example, may be used to move the input shaft incrementally through remotely controllable amounts.

A practical application of the unit such as shown in FIG. 4 is shown in FIG. 5. In this case the apparatus is used to control the operation of a railroad track continuous lining machine. A preliminary measurement of the track is made using, for example, a machine running ahead of the machine used to make any adjustment, and this measurement is recorded, conveniently in digital or analog manner on a magnetic tape or other memory. The operator of the adjustment machine would follow the actual measurement displayed, allowance being made for the position difference between the adjustment machine and the machine making the measurement and suitable control of the adjustment machine would be effected by the operator to bring the actual track position into conformity with the desired position. This control would simply be effected by moving the control knob 51 with the second input shaft 13 connected to register the actual track position. Specifically, the device may be used to adjust the level of the track in which case a reference condition is applied to the servo control valve by means of a pendulum assembly which replaces the feedback lever 58 and linkage 59—the unit operating in open loop control conditions. Referring to FIG. 5, a pivoted pendulum 60 with a counter balance 61 at one end and a gear segment 62 at the opposite end is mounted on the valve casing and is drivably connected to the second input shaft 13 through a pinion 63 which meshes with the teeth of the gear segment 62 integral with the pendulum 60. The pendulum 60 takes up a vertical position and thus rotates the second input shaft 13 to a position representing a horizontal datum or reference. The first input shaft 12 may be moved using the control knob 51 with reference to the calibrating dial 52 to set the track or specifically a track rail with reference to the horizontal reference provided by the pendulum 60. For example, in a straight length of track it may be desirable to have the track rails at the same elevation so that the track is level whereas for a turn in the track is desirable to bank the track so that one rail is higher than the other. The unit would be attached rigidly to the frame of the machine which would be running along the track rails and would be arranged so that the pendulum hangs vertically downwards when the machine is running along level rails. Any deviation of the track from this level condition is registered by a movement of the machine running on the rails with reference to the pendulum 60 which remains vertical. In this condition the only input is through the second input shaft 13 and suitable sensitive response is achieved by the gearing between the pinion 63 and the gear segment 62. The latter may be replaced by a direct connection, that is by pivoting the pendulum 60 directly upon the second input shaft 13, according to the desired response. If it is desired to achieve a change in level from the horizontal the control knob 51 may be moved with reference to the calibrating dial 52 so that the null condition of the rotary fluid valve, in which no fluid is supplied to the adjustment actuators is achieved when the machine running on the rails is no longer level.

A device of this kind could be used in any levelling application for example on roadway construction. The levelling may be achieved about any desired axes, according to the mounting of the unit and the pendulum 60.

As an example of the sensitivity of levelling operations achievable, a 60 to 1 ratio could be used between the worm gear 55 and the bevel gear 56 so that super elevation, that is elevation of one rail with respect to the other, of up to 6 inches could be dialed with each one inch of super elevation being controlled by movement of the control knob through 60°, thereby enabling very fine adjustment of super elevation. Continuous control of super elevation can readily be affected by the operator simply moving the control knob 51 to the desired position on the calibrating dial 52 as the machine moves along the track.

Figure 6A:
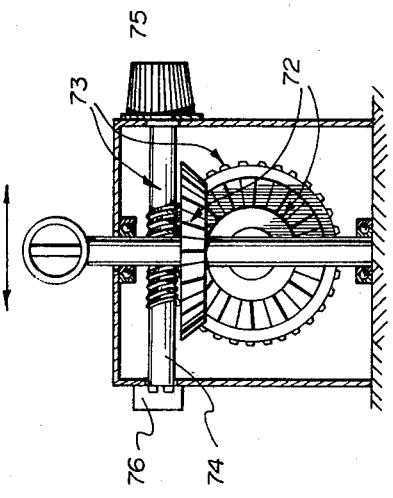
FIGS. 6a and 6b show sectional views of part of a servo control valve adapted for use in an alignment device with an optical sight mounted on one input shaft.
Figure 6B:
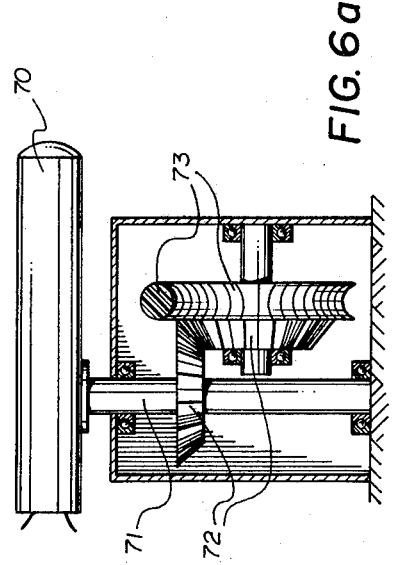

Another adaptation of the servo control unit according to the invention is shown in FIGS. 6 and 6a in which an optical sight 70 is mounted for rotation on a shaft 71 which is in turn connected through bevel gearing 72 and a worm and bevel gearing 73 to a shaft 74 which is connectable through a connection 76 for remote control of the first input shaft of a remotely positioned servo control valve such as that described previously. For example, a mechanical linkage such as a flexible shaft could be used to interconnect the shaft 74 with the first input shaft of the remote servo control unit. Adjustment of the shaft 74 can be affected using an adjustment knob 75 mounted on one end thereof. In operation, the optical sight 70 would be lined up with the position of the element under control and the adjustment knob 75 would be moved to ensure that the optical side was kept sighted upon the element. The adjustment movements would be transmitted throught the connection 76 and the unshown remote linkage to the remote servo control valve to effect the necessary movement of the element under control to achieve the desired alignment between the element position and the position of the slghting unit. In this way the device could be used to direct the element under control with respect to a fixed location or target. For example, such a device could be used for aligning the railroad track with respect to a series of stakes set by a track surveyor so that the track follows the correct path. Similar devices could be used to control the track elevation and the track level as previously described. In this way three units could be used in conjunction to align the track along three axes.

Figure 7:
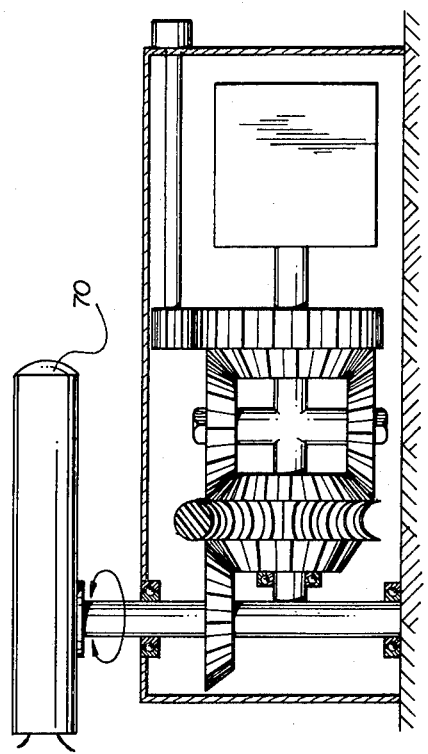
FIG. 7 shows an overall alignment device incorporation the arrangements of FIGS. 6a and 7b.
Figure 8B:
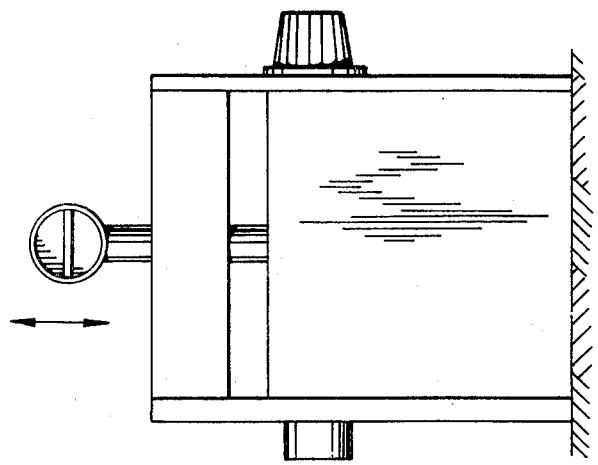
FIGS. 8a and 8b show a modification of the alignment device shown in 6a, 6b and 7 for aligning railway track.
Figure 8A:
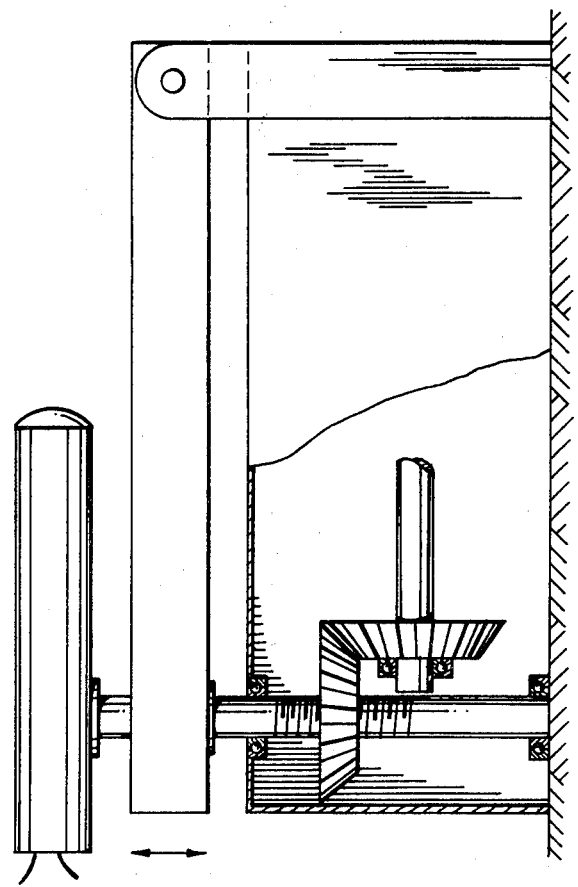
Figure 10:
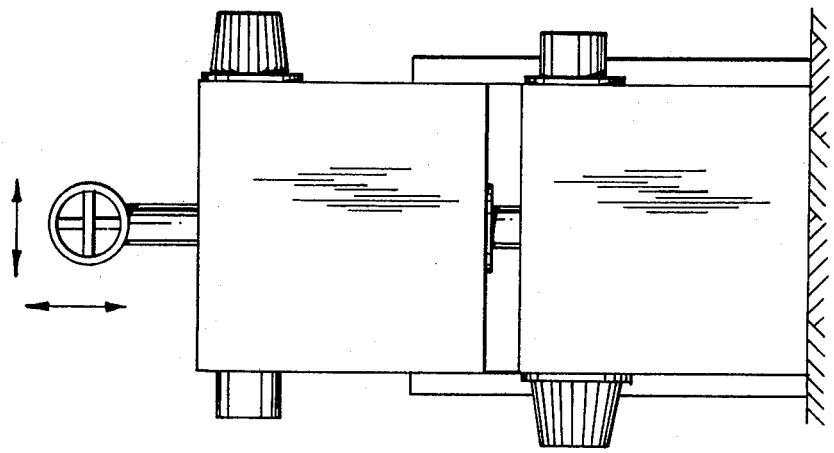
FIGS. 9 and 10 respectively show side and end elevations of two alignment devices operatively interconnected, each unit being of the general kind shown in FIGS. 6a, 6b, 7, 8a, 9 and 10.
Figure 9:
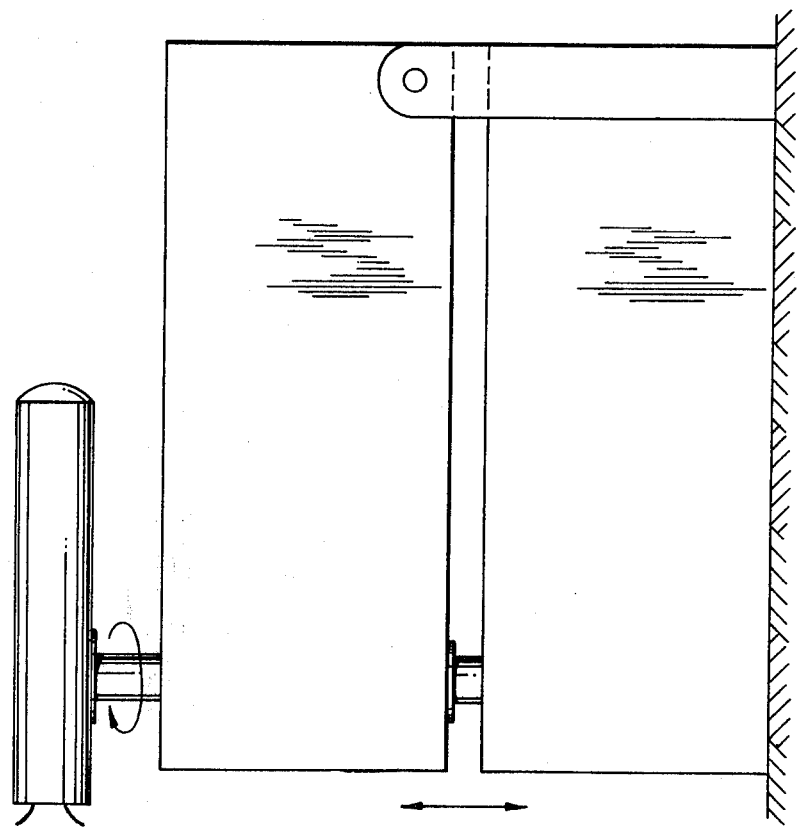

FIG. 7 illustrates a compact optical sighting unit in which the optical sight 70 is mounted directly on the servo control unit. In this construction the worm and the bevel gearing 73 is directly connected to the differential gear unit. Other parts of the servo control unit correspond with those previously described. FIGS. 8a and 8b illustrate a unit adapted to register vertical movement of the optical sight in addition to angular movement thereof thus enabling alignment about two mutually perpendicular axes. FIGS. 9 and 10 illustrate how the vertical movement of the sight can be applied as an input to one unit of a pair of adjacent units and the angular movement of the sight can be applied to the other two units.

Figure 12:
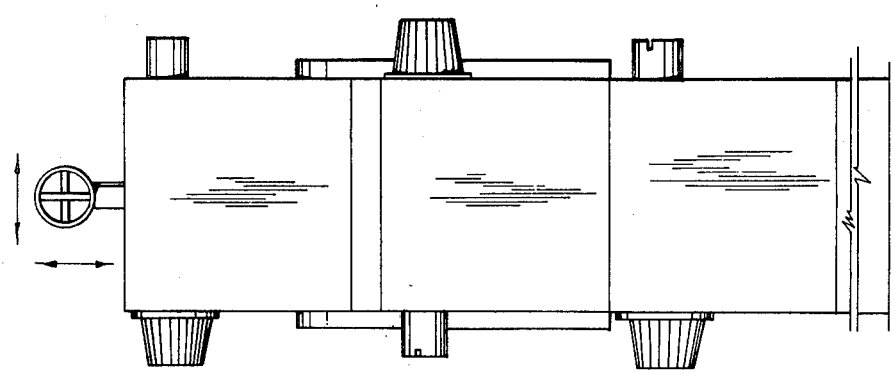
FIGS. 11 and 12 show three alignment devices operatively interconnected.
Figure 11:
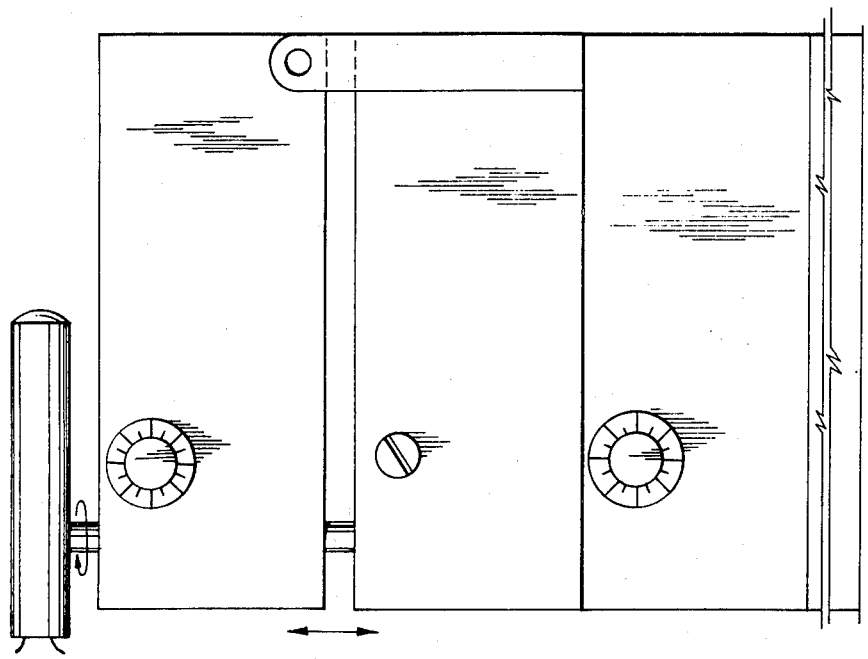

FIGS. 11 and 12 illustrate three units combined to register movement about three mutually perpendicular axes.

What I claim as my invention is:

1. A condition responsive servo control valve for controlling a variable condition of an actuator means for controlling a remote element, the valve comprising a first input shaft rotatable according to a desired input condition and a second input shaft rotatable according to the condition of the remote element, an output shaft, a differential gear train interconnecting said first and second input shafts to said output shaft, and a rotary fluid valve operably connected to said output shaft to provide a fluid output representing the difference between the conditions determining the first and second input shaft positions, said rotary fluid valve having a valve inlet means and a valve outlet means, a rotary valve plate drivably connected to said output shaft and a stationary valve plate with which said rotary valve plate is in mating relationship, said rotary and stationary valve plates each having fluid flow ports therein respectively connected to the valve inlet means and the valve outlet means and arranged in a cooperative relationship to control fluid flow from the valve inlet means and direct it to the valve outlet means with the flow being according to the relative angular positions of said rotary and stationary valve plates, whereby said output can be applied to the actuator means operable to bring the condition of the remote element other than the desired input condition and the desired input condition into conformity.

2. A valve as claimed in claim 1 further comprising reduction gearing between said first input shaft and said differential gear train, thereby to increase the sensitivity of response of said rotary fluid valve to said movement of said first input shaft.

3. A valve as claimed in claim 1 further comprising reduction gearing between said second input shaft and said differential gear train, thereby to increase the sensitivity of response of said rotary fluid valve to movement of said second input shaft.

4. A valve as claimed in claim 1 wherein said rotary and stationary valve plates each have in their mating surfaces generally annular ports with a width varying in the peripheral direction of the valve plate according to the desired output flow-rate per change in relative angular position of said valve plates.

5. A valve as claimed in claim 4 wherein said valve ports are movable to a null position corresponding to no relative angular displacement between the first and second input shafts and equality between the desired condition and the condition other than the desired condition, at which null position said fluid flow ports are positioned so that there is no fluid connection between said valve inlet means and said valve outlet means and thus no fluid output.

6. A valve as claimed in claim 1 wherein said rotary fluid valve has a chamber on the side of said rotary valve plate toward said valve inlet means for biasing said rotary valve plate toward said stationary valve plate to achieve a sealing action therebetween.

7. A valve as claimed in claim 1, wherein said differential gear train comprises two intermeshing pairs, each of mutually-opposed, coaxial, independently-rotatable bevel gears; one of the gears of one pair being drivably connected to said first input shaft and the other gear of that pair being drivably connected to said second input shaft; and a spider in which the other pair of bevel gears is supported for being freely and independently rotatable about a common axis at right angles to the common rotational axis of said one pair with the gears of said other pair intermeshing with both gears of said one pair on opposite sides of the rotational axis of said one pair; said spider being drivably connected to said output shaft, whereby to move in accordance with differential movement between said first and second input shafts.

8. A valve as claimed in claim 1 further comprising spring biasing means urging said stationary and rotary valve plates into rotational sealing engagement.

* * * * *